J. F. O'CONNOR.
FRICTION SHOCK ABSORBING MECHANISM.
APPLICATION FILED JAN. 20, 1919.
1,341,150.
Patented May 25, 1920.
2 SHEETS—SHEET 2.
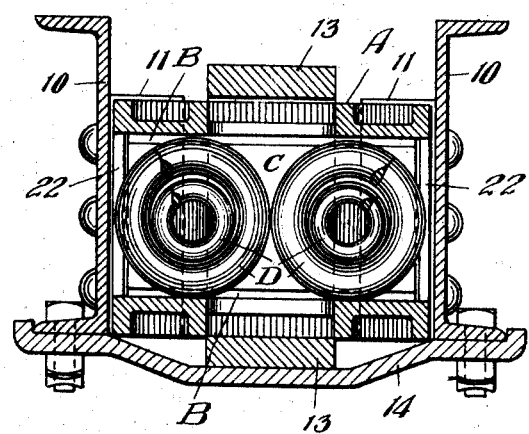
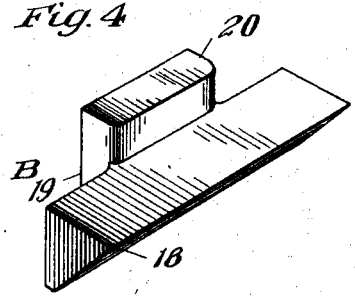
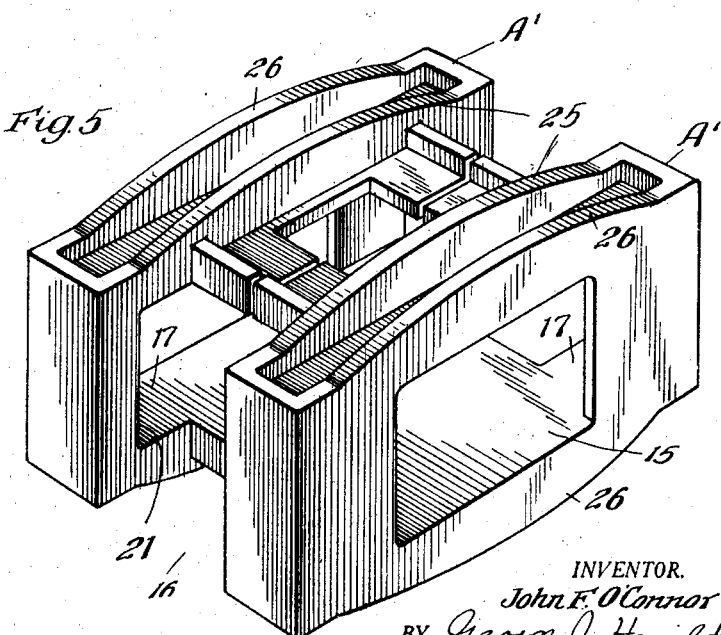
WITNESSES:
Wm. Geiger
INVENTOR.
John F. O'Connor
BY George D. Haight
his ATTORNEY

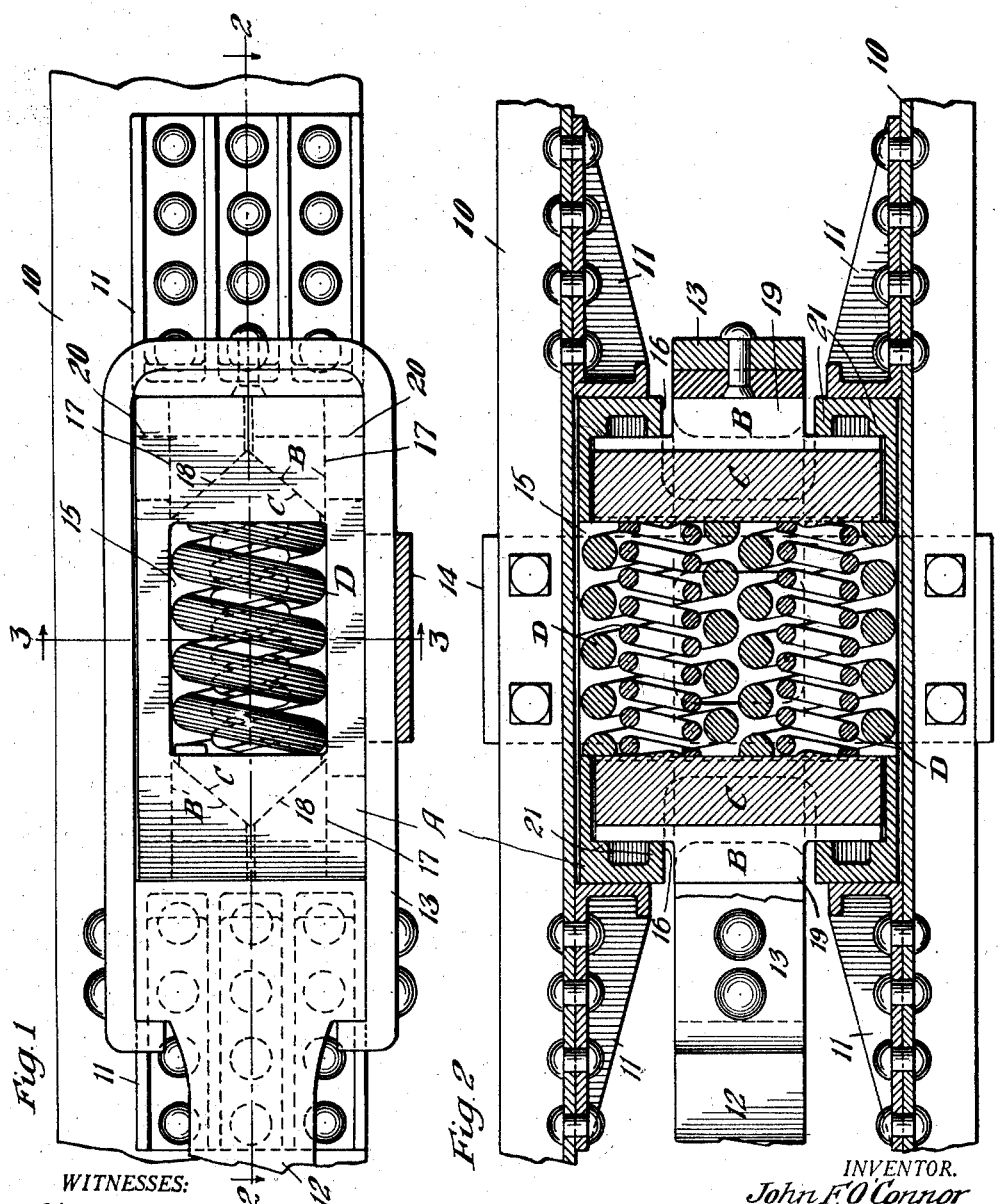

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,341,150.	Specification of Letters Patent.	Patented May 25, 1920.

Application filed January 20, 1919. Serial No. 271,942.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

One object of the invention is to provide an efficient and relatively inexpensive friction shock absorbing mechanism adapted especially for railway draft riggings.

Another and more specific object of the invention is to provide a friction shock absorbing mechanism of compact form and in which all the friction elements may be readily cast at minimum expense.

In the drawings forming a part of this specification, Figure 1 is a part elevational view, part longitudinal section of a portion of a railway draft rigging showing my improvements in connection therewith. Fig. 2 is a horizontal, sectional view taken on the line 2—2 of Fig. 1. Fig. 3 is a vertical, transverse, sectional view taken on the line 3—3 of Fig. 1. Fig. 4 is a detailed perspective of one of the friction shoes. And Fig. 5 is a detailed perspective view showing another form of friction shell or housing.

Referring to the construction illustrated in Figs. 1 to 4 inclusive, 10—10 denote channel-shaped draft sills of a railway car underframe, 11—11 front and rear stops of well known form, 12 a draw bar, 13 a yoke strap riveted to the draw bar, and 14 a detachable saddle plate for supporting the various parts of the rigging. The improved shock absorbing mechanism, as shown, comprises a friction shell or housing A, two friction shoes B—B at each end of the shell A, a wedge spring follower C at each end of the shell A, and horizontal twin arranged springs D—D.

The shell A is of substantially rectangular form and has side openings 15—15 and end openings 16—16. The shell A is provided at each end thereof with a pair of upper and lower horizontally extending friction surfaces 17—17 with which coöperate the upper and lower friction surfaces of the shoes B—B, respectively. Each shoe B is formed on its inner end with a friction wedge surface 18 coöperable with the corresponding adjacent wedge face of the wedge spring follower C. The twin springs D are extended between the wedge followers C as clearly apparent from an inspection of Figs. 1 and 2.

The shell A is made of such length that it is held stationary between the front and rear sets of stops 11 and the cut away end portions 16 of the shell accommodate the forward and rearward movements of the draw bar and yoke, as will be apparent. In order that the friction shoes B may be properly actuated, the same are extended at their central portions toward the respective ends of the shell A as indicated at 19. The extended portions 19 are made flush with the end faces of the shell A so as to normally engage the draw bar butt and filler block of the yoke, as will be understood from an inspection of Fig. 2. On their upper and lower faces respectively, the upper and lower friction shoes B are provided with bosses 20—20 which are accommodated in the recesses 16 that are cut away partly from the upper and lower walls of the shell A.

From an inspection of Fig. 2, it will be seen that the shoes B are limited in their separating movement by engagement with interior shoulders 21 formed on the shell A and furthermore the shoes B and wedges C are held within the shell A against lateral displacement by the side walls 22 of the shell. In assembling the parts, the shoes B are first applied then the wedge followers C and finally the springs D. When assembled, it is evident that the shock absorbing mechanism is self-contained and without the necessity of employing any bolts or other expedients such as have heretofore been common.

In operation, upon inward movement of the draw bar, the two front shoes B—B are forced rearwardly against the spring-pressed wedge follower C. Friction is thus generated between the front shoes B and the upper and lower friction surfaces of the shell A. During buff, the rear set of friction elements do not come into play, the latter being actuated only under draft, at which time the front set of friction elements remain stationary.

In Fig. 5 the shell is shown as formed in two parts A'—A' separated by a central, longitudinally extending division. The formation of the shell on its interior is the same as in the case of the shell A. On the exterior, however, the shell A'—A' is preferably formed on top and bottom with longitudinally extending ribs 25 and 26. These ribs provide additional strength for the shell, as will be evident, and in addition the inner set of ribs 25 are preferably so located as to form guideways for the upper and lower arms of the yoke.

I claim:

1. In a friction shock absorbing mechanism, the combination with a friction shell having an opening in one end thereof of lesser width than the shell, of friction shoes disposed within the shell and extending across said opening, said shell having interior shoulders on opposite sides of the opening with which said shoes coöperate and are limited in their outward movement with respect to the shell, said shoes having projections extending through the opening of the shell, means for yieldingly resisting movement of said shoes with respect to the shell, and means for transmitting pressure to said shoes.

2. In a friction shock absorbing mechanism, the combination with a friction shell of substantially rectangular cross section, said shell having upper and lower walls and integral end walls, the shell being open on its sides and provided with an opening in one end wall thereof, of friction shoes slidably mounted within said shell and extending transversely thereof across said end opening, said shoes having inner wedge faces, a wedge coöperating with the wedge faces of the shoes, and spring means within the shell engaging said wedge, said spring means being insertible through the open sides of the shell.

3. In a friction shock absorbing mechanism, the combination with a friction shell of substantially rectangular cross section and provided with upper and lower walls and end walls, the sides of said shell being open and the end walls thereof being provided with openings; of a pair of transversely disposed friction shoes within each end of the shell, said shoes extending across the openings in the ends of the shell, said shoes having also wedge faces on their inner sides; a wedge coöperable with each end set of friction shoes; and spring means interposed between the wedges, said spring means being insertible through the open sides of the shell.

4. In a draft rigging, the combination with draft sills having stops, a draw bar, and yoke acting means; of a friction shell mounted between the sills and co-acting with said stop means, the shell being prevented from longitudinal movement, said shell having an opening in each end thereof and provided with interior, upper and lower longitudinally extending friction surfaces; a pair of friction shoes at each end of the shell and located therewithin, said shoes coöperating with said upper and lower friction surfaces and extending across the corresponding adjacent open end of the shell, said shoes having inner wedge faces and provided with projections extending through the said end openings to be thereby actuated from the draw bar and yoke acting means; a wedge coöperable with each pair of friction shoes and also extending transversely of the shell; and spring means interposed between the wedges.

In witness that I claim the foregoing I have hereunto subscribed my name this 5th day of Jan., 1919.

JOHN F. O'CONNOR.